(12) United States Patent
Kulkaski

(10) Patent No.: US 6,207,092 B1
(45) Date of Patent: Mar. 27, 2001

(54) PROCESS FOR MAKING A DRAG SHIELD FOR A POWER MOWER

(75) Inventor: Stanley V. Kulkaski, Warren, NJ (US)

(73) Assignee: K. Jabat, Inc., Green Brook, NJ (US)

( * ) Notice: Subject to any disclaimer, the term of this patent is extended or adjusted under 35 U.S.C. 154(b) by 0 days.

(21) Appl. No.: 09/321,943

(22) Filed: May 28, 1999

(51) Int. Cl.[7] .................................................. B29C 47/06
(52) U.S. Cl. ............................ 264/173.12; 264/173.14; 264/173.17; 264/173.19; 264/177.1; 264/255
(58) Field of Search .......................... 264/177.1, 173.11, 264/171.27, 172.1, 173.12, 173.16, 173.17, 171.13, 171.21, 255, 259, 271.1, 173.14, 173.19; 16/225

(56) References Cited

U.S. PATENT DOCUMENTS

| | | | |
|---|---|---|---|
| 2,241,101 | 5/1941 | Teeter | 220/30 |
| 2,382,177 | * 8/1945 | Schanz . | |
| 2,526,129 | 10/1950 | Groesbeck | 16/150 |
| 2,592,411 | 4/1952 | Fronhapel | 16/150 |
| 2,607,411 | 8/1952 | VanVliet | 160/231 |
| 2,829,081 | 4/1958 | Sween | 154/118 |
| 3,226,920 | 1/1966 | Gilbertson | 56/255 |
| 3,378,995 | 4/1968 | Welsh | 56/25.4 |
| 3,727,386 | 4/1973 | Jespersen | 56/320.1 |
| 3,799,579 | 3/1974 | Dahl | 280/150 R |
| 4,030,277 | 6/1977 | Christopherson | 56/320.1 |
| 4,241,567 | 12/1980 | Carolan | 56/17.4 |
| 4,282,704 | 8/1981 | Stevens | 56/320.1 |
| 4,438,605 | * 3/1984 | DeLucia | 52/71 |
| 4,526,528 | * 7/1985 | Kline et al. | 425/133.5 |
| 4,536,362 | * 8/1985 | Donaldson | 264/141 |
| 4,658,472 | * 4/1987 | Grenier | 16/225 |
| 4,769,199 | * 9/1988 | Bemis et al. | 264/139 |
| 4,885,820 | 12/1989 | Erceg | 16/225 |
| 4,921,563 | * 5/1990 | Schwertner et al. | 156/303.1 |
| 5,181,371 | 1/1993 | DeWorth | 56/17.4 |
| 5,338,130 | * 8/1994 | Baerveldt | 404/33 |
| 5,398,376 | * 3/1995 | Pollack | 16/225 |
| 5,447,021 | 9/1995 | Plamper | 56/17.4 |
| 5,826,304 | * 10/1998 | Carlson | 16/225 |
| 6,017,477 | * 1/2000 | Lu et al. | 264/172.1 |

* cited by examiner

Primary Examiner—Jan H. Silbaugh
Assistant Examiner—Mark Eashoo
(74) Attorney, Agent, or Firm—Kenneth Watov; Watov & Kipnes, P.C.

(57) ABSTRACT

A process for making a drag shield for a lawn mower includes forming from a rigid plastic material a relatively inflexible first end member adapted for secure attachment via a connecting element to an associated lawn mower deck, and a relatively inflexible second end member with a web portion extending therebetween for connecting the first and second end members. The web is formed from a rigid plastic material having a sufficiently thin and substantially uniform cross section for maintaining flexibility. The web and first and second end members are integral and provided in a single piece of rigid plastic material. The process further includes forming first and second layers of flexible plastic material on opposing sides of the web portion.

20 Claims, 5 Drawing Sheets

PROCESS FOR MAKING A DRAG SHIELD FOR A POWER MOWER

FIELD OF THE INVENTION

The field of the present invention relates generally to flexible hinges, and more particularly to such hinges made of a polymer material.

BACKGROUND OF THE INVENTION

It known in the art to use polymer material or flexible plastic material for providing a flexible hinge or web connected between rigid and unflexible material. For example, in the power lawn mower industry industrial safety standards have demanded that shields known as either drag shields, safety shields or trail shields be connected across the rear portion of the mower to prevent stones and other debris from being thrown up at the operator as they walk behind power mower. As described in greater detail below, one known type of trail shield includes a web of flexible polyvinyl chloride (PVC) material connected between a rigid pivotal structure or tube like element of vinyl material, for connection to the rear deck of a walk behind power mower, with the other end of the web being secured to a relatively large diameter tubular structure or curved end structure for gliding along and following the contours of a lawn being mowed. Typically the PVC flexible web is laminated to the tubular attachment member, and the large diameter tubular curved ground follower rigid vinyl structure. Because of the dissimilarity of the materials, it has been found that a delamination problem exists during use. Due to the flexing back and forth of the web and the attached rigid members, the bonds therebetween tend to break away, ultimately causing premature failure of the safety device, in this example, a drag shield. However, this problem can occur for any applications utilizing a flexible web of one material connected between rigid members of another material.

SUMMARY OF THE INVENTION

With the problems of the prior art in mind, the present invention includes two opposing and spaced apart rigid members of a first polymer material connected together by a centrally located web therebetween of the same material, with the web being a continuous structure emanating from each one of the opposing rigid members, whereby the web is made thin enough to permitted it to be flexible. The rigid members including the web are in one embodiment of the invention fabricated from a common rigid plastic material. A flexible plastic material is laminated to the interconnecting rigid plastic web material on opposing sides thereof, for strengthening the web, and improving its impact resistance.

BRIEF DESCRIPTION OF THE DRAWINGS

Various embodiments of the present invention are described below with reference to the drawings, in which like items are identified by the same reference designations, wherein.

DETAILED DESCRIPTION OF THE INVENTION

Various embodiments of the flexible hinge of the present invention are primarily described herein for use with walk-behind power lawn mower safety shields, typically otherwise known as drag shields or trail shields. However, the use of a flexible hinge of the present invention is not meant to be so limited. The flexible hinge of the present invention can be used for numerous applications suitable for plastic type flexible hinges, such as cabinet doors, tool box covers, storage chest covers, and so forth. However, by describing the present invention in relation to walk-behind power lawn mowers drag shields, problems in the prior art using such flexible hinges can be readily illustrated.

Figure 1:
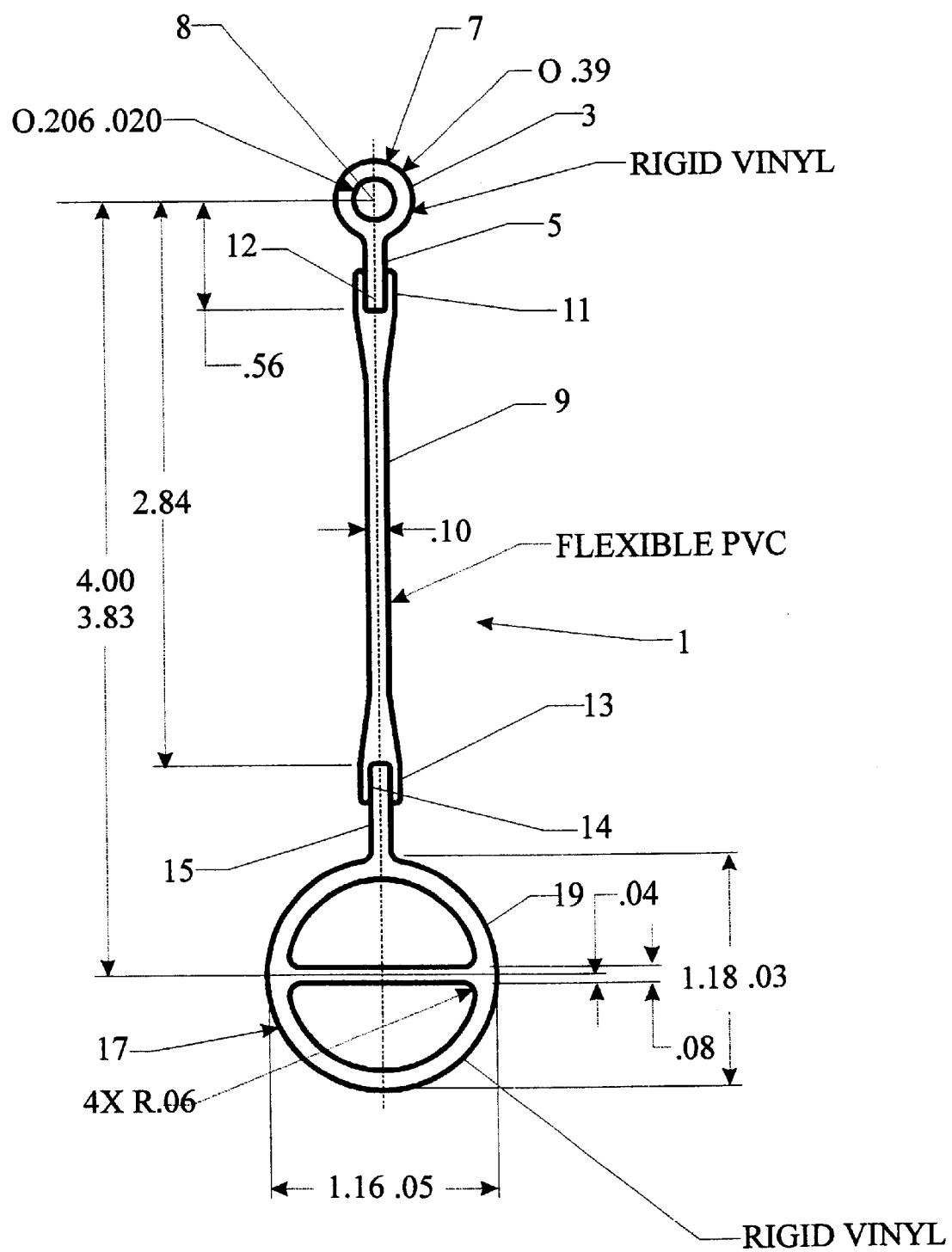
FIG. 1 shows a side elevational view of a trail shield of the prior art.

Drag or trail shields for walk-behind power lawn mowers are typically constructed as shown in the side elevational view of FIG. 1. Typical dimensions for such a drag shield are also shown in the figure. The drag shield globally denoted by reference 1 includes a rigid tubular element 3 including a downward projecting elongated lip member 5 that is rectangular in shape as shown. The combination of the tubular portion 3 and lip member 5 together form a pivotal structure 7 for attachment to the rear deck of a walk-behind power lawn mower. The pivotal structure 7 is typically mounted to the deck of the mower on a rod that is threaded through the hole 8 of the tubular portion 3, with the ends of the rod (not shown) securely mounted to opposing sides of the mower deck, as one example. As a result, the pivotal structure 7 is able to rotate about the rod or other mounting means. A web 9 of flexible material, in this example includes opposing ends 11 and 13 each including an elongated open channel 12, 14, respectively. The end of the lip 5 of the pivotal structure 7 is mounted within the channel 12 in the upper end 11 of web 9, shown through use of known bonding methods. The channel 14 in the lower end 13 of web 9 has the end of a lip 15 protruding from a ball structure 17, in this example, bonded thereto. The ball structure 17 includes either an elongated structure 19 having a circular cross section, or some other form of a curved elongated element for following or dragging along the ground and moving over various contours of the ground as a walk-behind power mower is moved back and forth in cutting a lawn, as will be described in greater detail below. Typically the pivotal structure 7 and slide ball structure 17 consists of an extruded or molded rigid vinyl material, and the web 9 of flexible PVC polyvinyl chloride.

Figure 2:
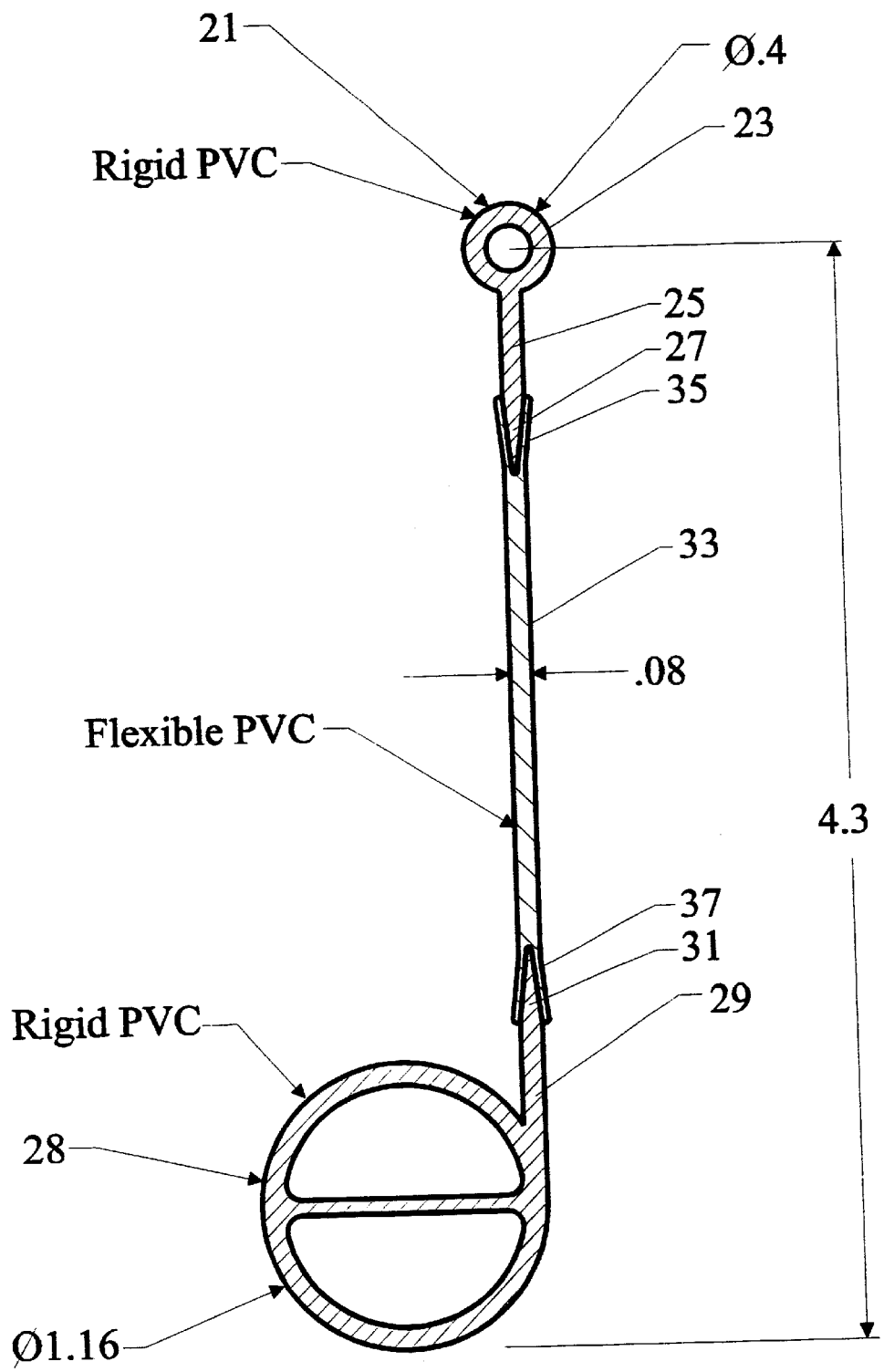
FIG. 2 shows a cross-sectional side elevational view of another form of a drag shield of the prior art incorporating a flexible web of one material between two rigid members of another material.

In FIG. 2, an alternative known design for a drag shield is shown in a side elevational view. The pivotal structure 21 includes an upper elongated tubular member 23 and a downwardly projected lip 25 that includes an interior rectangular portion, and terminates into a tapered and substantially pointed free end 27, as shown. The lower-most slide ball structure, instead of having a lip 15 projecting rectangularly as with the slide ball 17 of the example of FIG. 1, includes a tangentially projecting lip portion 29 that terminates in a tapered pointed end 31, as shown. As a result, the flexible web 33 includes an elongated V-channel 35 at its upper end, and a similar elongated V-channel 37 at its lower end, for receiving and bonding to the end lip portions 27, 31, respectively, as shown. As in the previous example, the pivotal structure 21 and slide ball 28 consist of extruded or molded rigid PVC, whereas the flexible web 33 consists of molded or extruded flexible PVC.

Figure 3:
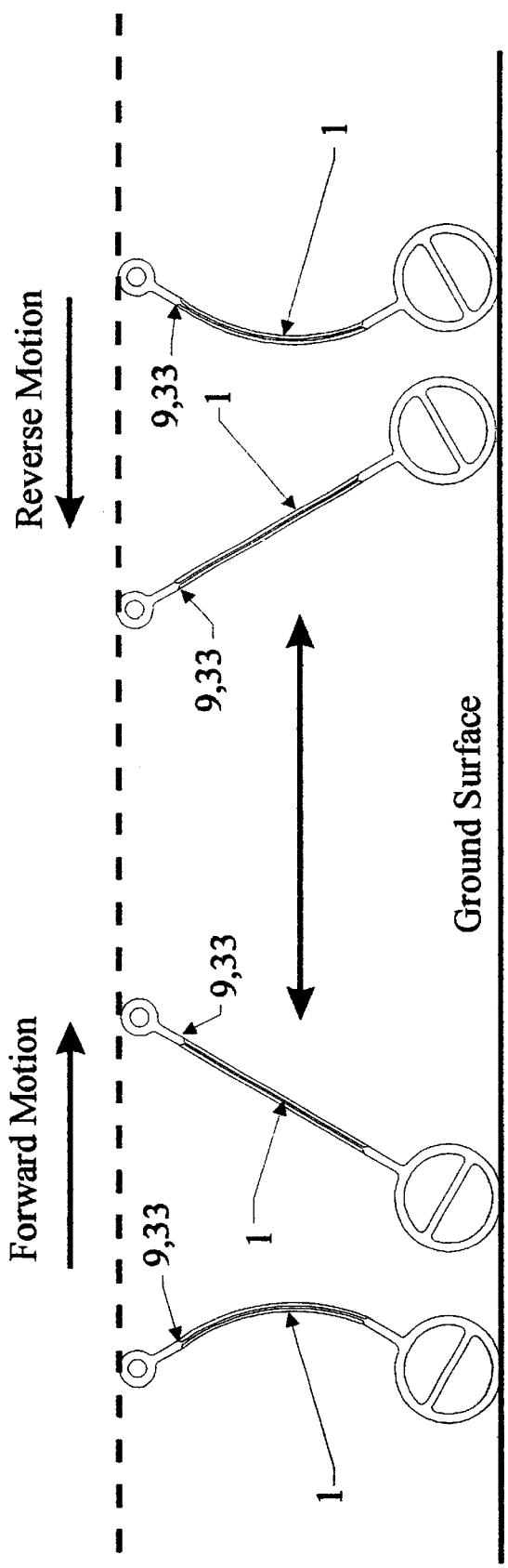
FIG. 3 shows the flexing of a drag or trail shield as it is moved back and forth as attached to a walk behind power lawn mower.

For the two examples of the drag shield shown in FIGS. 1 and 2, the dissimilar plastic materials of the web 9 relative to the pivotal structure 7 and slide ball of 17 of FIG. 1, and similar corresponding elements of FIG. 2, are laminated together, typically during extrusion, to form a secure bond therebetween. However, there is always a possibility that the bonds between the dissimilar plastic materials may delaminate, causing failure of the drag shield and a potential safety hazard. The power mower industry has attempted to overcome this problem through use of quality control testing procedures for insuring that from a statistical basis drag shields meet "Government and Long Lawn Care Products Manufacturers Standards". However, this statistical testing used does not permit every drag shield produced to be tested. This presents a potential safety hazard in that plastic hinges, as used in known drag shields, undergo extreme bending and flexing during use of an associated walk-behind power mower. As shown in FIG. 3, as a drag shield 1 is moved over a ground surface 39 during forward motion of an associated mower in the direction of the arrow shown, the web 9, 33 tend to bend as shown, and in the reverse motion of the power mower would tend to bend in the opposite matter, as shown. Accordingly, extreme stress is placed upon the bonded portions of the drag shields 1 during use. If the resulting stress applied to the bonded joints of dissimilar plastic material, causes the bonds to break, for example, the drag shield may fail due to the web portion tearing away from the pivotal structure.

Figure 4:
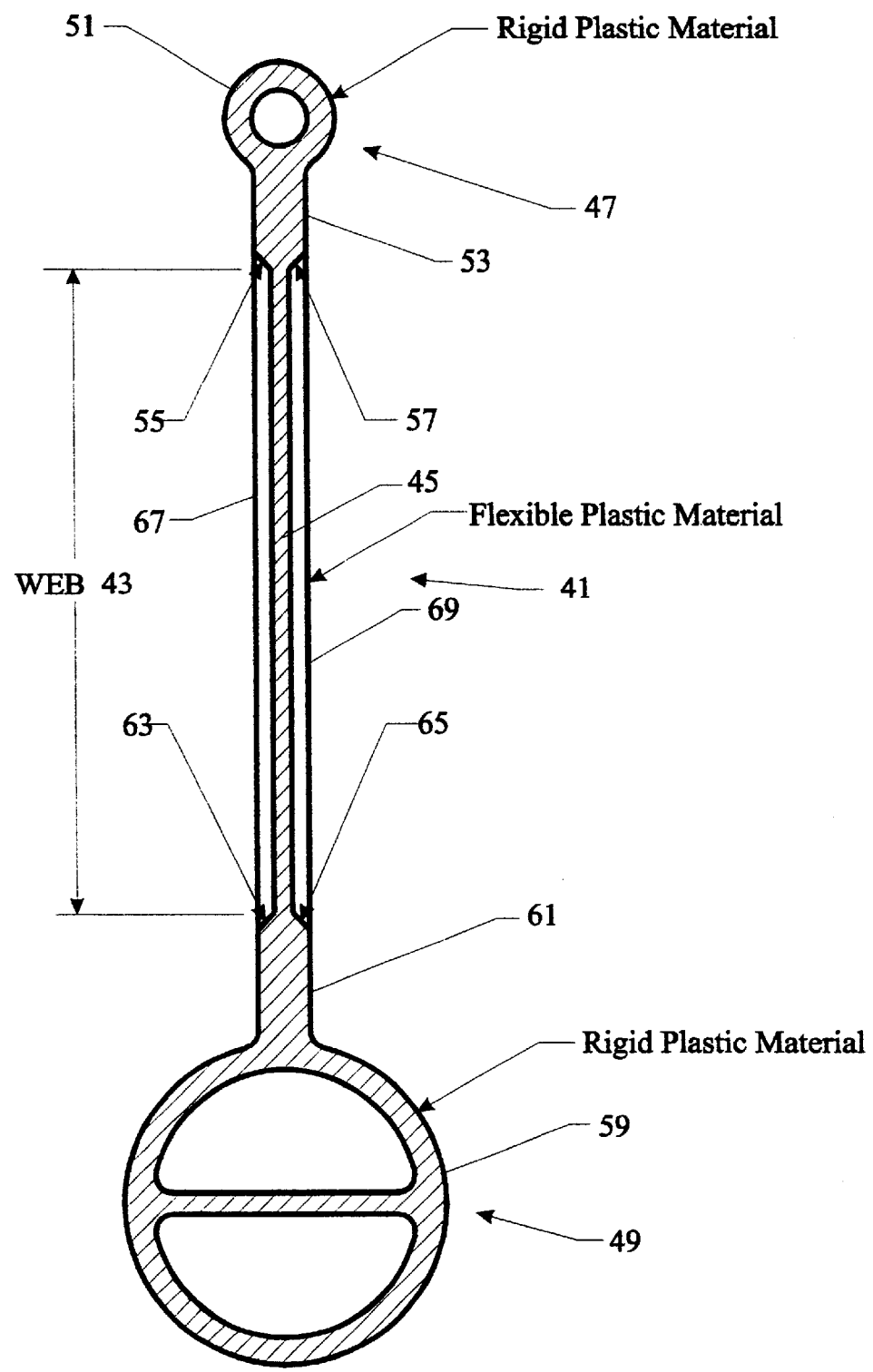
FIG. 4 shows a cross-sectional view of one embodiment of the invention applied for use in a trail or drag shield.

To overcome the problems in the prior art, the present inventor recognized that the stress placed upon bonded joints between dissimilar plastic materials must be overcome or substantially reduced, to enhance the reliability of such products using flexible hinges as drag shields. After much experimentation in a long-term development project, a new flexible hinge was developed that substantially overcomes the problems of delamination and/or bond breakage in the prior art. With reference to FIG. 4, as configured for use in an improved drag shield 41, one embodiment of the invention includes in a web portion 43 having a three layer configuration of laminated materials. The centermost web layer 45 consists of the same material as the upper pivotal structure member 47, and lower slide ball member 49, all of which in the preferred embodiment are extruded or molded together in a single piece. The pivotal structure 47 includes an elongated tubular member 51, with a regularly directed and downwardly projecting substantially rectangular limp portion 53, having downwardly projecting converging end portions 55 and 57 terminating with the relatively thin extension thereof forming the web portion 45. Similarly, the slide ball structure 49 includes an elongated portion 59 having a circular cross section, with a radially directed and upper wardly projecting lip portion 53 that is substantially rectangular in cross section, with its uppermost portion having ends 63, 65 converging to the lowermost portion of the central web 45. In the preferred embodiment of the invention, the pivotal structure 47, and slide ball structure 49 consists of a rigid olefin material, such as Montell 7823® (trademark of Montell, Inc.) or equivalent. This material is a high impact copolymer polypropylene made utilizing metallocene catalyst technology, that compared to other materials has superior mechanical and thermal properties. Although this plastic material is a rigid material, the present inventor determined that by making the thickness of the web 45 of this material about 0.02 inch, the web could be made to be flexible in this area.

To strengthen and reinforce the web area, a layer of flexible olefin material is formed in a first layer 67 on one side of the central web 45, and a similar layer 69 on the opposite side of the material of the central web 45. In the preferred embodiment, the flexible olefin is provide by either DOW/DUPONT 8480®(manufactured by a Dow Corning Company, and Dupont Corporation) or EXXON EXACT 0201®(manufactured by Exxon Corporation), or the equivalent. This material is a metallocene polyethylene, more particularly a saturated ethylene octane copolymer. Compared to other plastic materials, this material provides superior long term stability, improved weatherability, and high impact resistance.

Also in a preferred embodiment, the outer flexible plastic webbed layers 67 and 69 are laminated directly to the rigid plastic material of the central web 45 in an extrusion process. Further in the preferred embodiment, the thickness each one of the outer layers 67 and 69 is about 0.030 inch, making the total thickness of the central web to be about 0.08 inch, in this example. The flexible plastic layers 67 and 69 serve not only to strengthen the central web layer 45 against breakage or cracking, but also insure that the inventive drag shield meets various impact test requirements, such as CPSC No.1205.4, ANSI\OPEI B 71.1, and EN 836, and other specifications introduced by various manufacturers for guaranteeing the safety performance of drag shields. Tests completed of the inventive design in FIG. 4 have proved that the delamination problem of the prior art has been substantially eliminated, due in large part to the avoidance of any discontinuities or breaks in the material, such as by joints, between the centralmost web portion 45, and the rigid end structures, in this example being the pivotal structure 47 and slide ball structure 49, respectively. However, although the olefin materials indicated previously are at the present time considered the preferred materials for use with the flexible hinge structure of the present invention, such materials are not meant to be limiting. It is believed that improvements can be made to the inventive flexible web through the careful selection of the thicknesses of the central web portion 45, and outer web portion layer 67 and 69, in addition to modifying the plastic materials used for these portions for improving impact resistance and flexibility for meeting different requirements and uses for the inventive flexible web.

Figure 5:
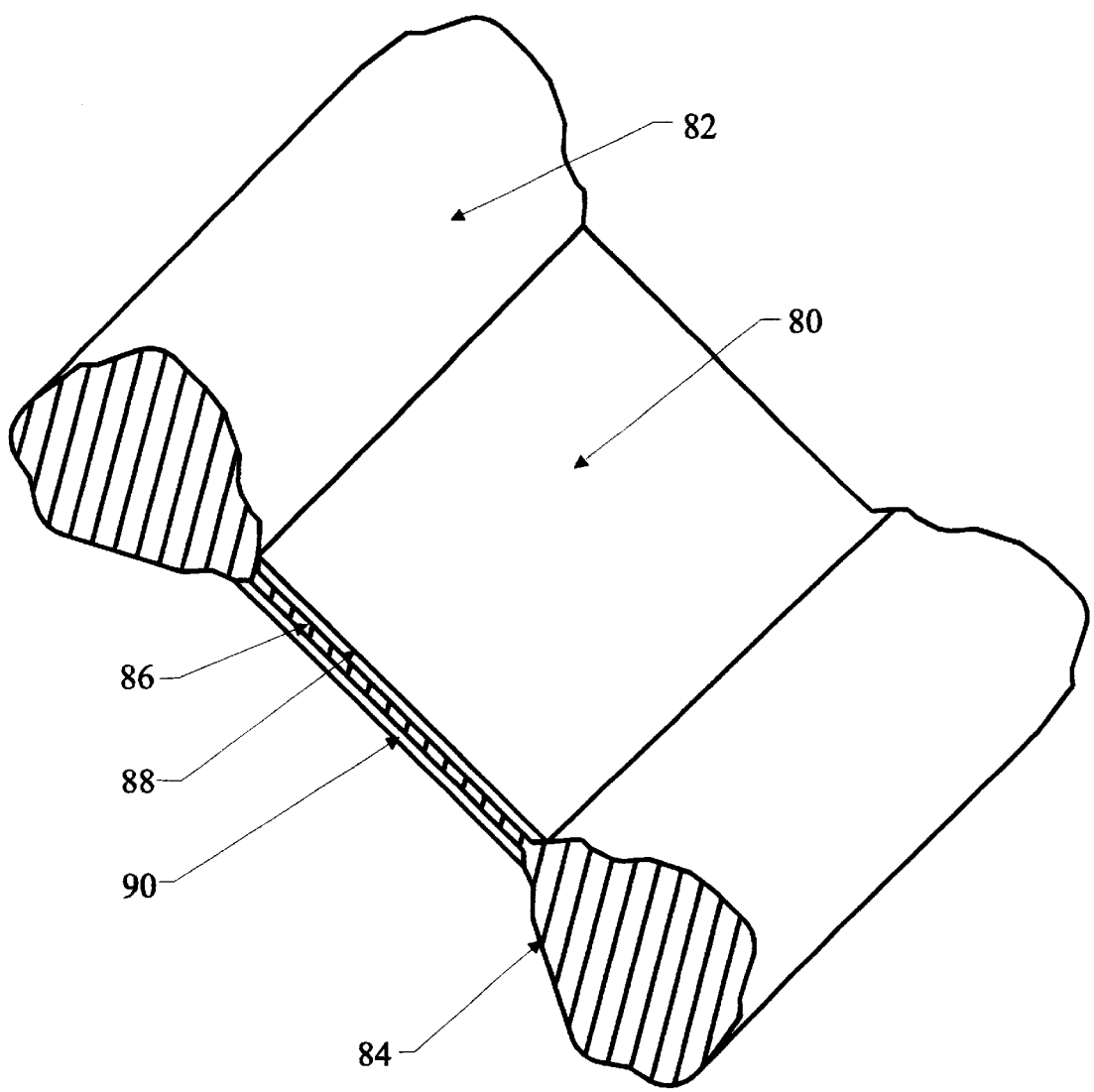
FIG. 5 shows another embodiment of the invention for providing a flexible web between rigid members or structures having any given shape.

As has been indicated previously, the flexible web of the present invention is not limited to use with walk-behind power lawn mower drag shields or trail shields, but has multiple uses in any applications where a plastic hinge is used. For example, as shown in FIG. 5, a generalized application of the inventive flexible hinge 80 is shown connected between two rigid plastic end members 82 and 84. As with the application for use in the drag shield, the inventive flexible hinge 80 includes a thin central web layer 86 consisting of the same rigid plastic materials as end portions 82 and 84, and being formed as a single piece therewith thereby avoiding any discontinuities or breaks therebetween. Flexible plastic layers 88 and 90 are bonded on opposing sides of the rigid plastic central web portion 86. The central rigid plastic material of web portion 86 is made thin enough to be flexible.

In static pull tests using 100 pounds static weight over 50% of the profile the present inventive flexible hinges using the identified preferred olefin materials in the drag shields had no breaks or separation of the web from the rigid members. In comparison, drag shields of rigid PVC and flexible PVC failed at over 50 pounds static weight over 50% of their profile.

Although, various embodiments of the invention have been shown and described, they are not meant to be limiting. Those of skill in the art may recognize certain modifications to these emboiments, which modifications are meant to be covered by the appended claims.

What is claimed is:

1. A method for making a plastic hinge, comprising the steps of:

forming from a rigid plastic material a relatively inflexible first end terminating member adapted for secure attachment via a pirotal structure to an associated structure;

forming from said rigid plastic material a relatively inflexible second end terminating member;

forming from said rigid plastic material a web between and connecting said first and second end terminating members;

making said web thin enough to be flexible;

forming a first layer of flexible plastic material on one side of said web; and forming a second layer of flexible plastic material on an opposite side to said one side of said web.

2. The method of claim 1, wherein said first and second end terminating members, and said web are formed from a single piece of said rigid plastic material.

3. The method of claim 2, wherein said rigid plastic material is a rigid olefin.

4. The method of claim 2, wherein said rigid plastic material is a high impact copolymer polypropylene.

5. The method of claim 1, wherein said rigid plastic material is a rigid olefin.

6. The method of claim 1, wherein said rigid plastic material is a rigid olefin, and said flexible plastic material is a flexible olefin.

7. The method of claim 1, wherein said rigid plastic material is a high impact coptolymer polypropylene.

8. The method of claim 1, wherein said rigid plastic material is a high impact copolymer polypropylene, and said flexible plastic material is metallocene polyethylene.

9. The method of claim 8, wherein said first and second end terminating members, said web, and said first and second layers are extruded at the same time.

10. The method of claim 1, wherein the first end terminating member further includes a rigid elongate body with a longitudinally-directed throughhole whereby the pirotal structure is a rod threaded therethrough for permitting rotational movement of the first end member about said rod.

11. The method of claim 10, wherein the associated structure is a deck of a lawn mower.

12. The method of claim 1, wherein the second end terminating member is adapted for secure connection to another associated structure.

13. The method of claim 1, wherein the web includes a thickness of about 0.02 inch.

14. The method of claim 1, wherein each of the first and second layers of flexible plastic material includes a thickness of about 0.03 inch.

15. The method of claim 1, wherein said first and second end terminating members are elongate and extend longitudinally along said web.

16. A method for making a drag shield for a lawn mower comprising the steps of:

forming from a rigid plastic material a relatively inflexible first end member adapted for a secure mount to a deck of said lawn mower;

forming from said rigid plastic material a relatively inflexible second end member, said second end member adapted for moving over varions contuors of the ground while being dragged on the ground behind said power mower;

forming from said rigid plastic material a web between and connecting said first and second end members;

making said web thin enough to be flexible;

forming a first layer of flexible plastic material on one side of said web; and forming a second layer of flexible plastic material on an opposite side to said one side of said web.

17. The method of claim 16, wherein said first and second end members, and said web are formed from a single piece of said rigid plastic material.

18. The method of claim 17, wherein the web includes a thickness of about 0.02 inch, and each of the first and second layers of flexible material includes a thickness of about 0.03 inch.

19. The method of claim 16, wherein said rigid plastic material is a rigid olefin.

20. The method of claim 16, wherein said rigid plastic material is rigid olefin, and said flexible plastic material is a flexible olefin.

* * * * *